US011455855B2

(12) United States Patent
Jawaharlal et al.

(10) Patent No.: US 11,455,855 B2
(45) Date of Patent: Sep. 27, 2022

(54) CONTENT VALIDATION DOCUMENT TRANSMISSION

(71) Applicant: International Business Machines Corporation, Armonk, NY (US)

(72) Inventors: Samuel Mathew Jawaharlal, Chennai (IN); Sathya Santhar, Chennai (IN); Sarbajit K. Rakshit, Kolkata (IN); Balamurugaramanathan Sivaramalingam, Paramakudi (IN)

(73) Assignee: International Business Machines Corporation, Armonk, NY (US)

(*) Notice: Subject to any disclaimer, the term of this patent is extended or adjusted under 35 U.S.C. 154(b) by 151 days.

(21) Appl. No.: 16/580,147

(22) Filed: Sep. 24, 2019

(65) Prior Publication Data

US 2021/0090371 A1 Mar. 25, 2021

(51) Int. Cl.
*G07D 7/005* (2016.01)
*G07D 7/20* (2016.01)
*G06V 30/414* (2022.01)
*G06V 30/416* (2022.01)

(52) U.S. Cl.
CPC ......... *G07D 7/0053* (2013.01); *G06V 30/414* (2022.01); *G06V 30/416* (2022.01); *G07D 7/2016* (2013.01)

(58) Field of Classification Search
None
See application file for complete search history.

(56) References Cited

U.S. PATENT DOCUMENTS

| 7,676,501 | B2 | 3/2010 | Wilson |
| 7,817,295 | B2 | 10/2010 | Henry et al. |
| 8,239,966 | B2 | 8/2012 | Smithson |
| 8,386,511 | B2 | 2/2013 | Schneider |
| 9,292,495 | B2 | 3/2016 | Bostick et al. |
| 9,342,697 | B1 * | 5/2016 | Ren ........................ G06F 21/554 |

(Continued)

FOREIGN PATENT DOCUMENTS

CN 103577765 A * 2/2014

OTHER PUBLICATIONS

Machine Translation CN 103577765 A (Year: 2014).*

(Continued)

*Primary Examiner* — Michelle M Entezari Hausmann
(74) *Attorney, Agent, or Firm* — Eric Chesley (57) ABSTRACT

A document is received by a first computer system from a second computer system. The document is received through a network. A document level security code is received by the first computer system through a second network. A content level security code is received by the first computer system and through the second network. A first validation operation is performed by the first computer system. The performance is based on the document level security code. The first computer system determines the document is an altered document. The determination is based on the performance of the first validation operation. A second validation operation is executed on the altered document. The second validation operation is executed by the first computer system and in response to the determination. An alteration status of the document is detected by the first computer and based on the second validation operation.

20 Claims, 4 Drawing Sheets

(56) References Cited

U.S. PATENT DOCUMENTS

| | | | | |
|---|---|---|---|---|
| 9,377,991 | B1* | 6/2016 | Rapport | G06F 16/438 |
| 9,705,917 | B2 | 7/2017 | Pravetz et al. | |
| 2004/0162076 | A1* | 8/2004 | Chowdry | H04L 67/30 |
| | | | | 455/445 |
| 2005/0021980 | A1* | 1/2005 | Kanai | H04N 1/4426 |
| | | | | 713/182 |
| 2005/0262428 | A1 | 11/2005 | Little et al. | |
| 2006/0041891 | A1* | 2/2006 | Aaron | G09B 7/00 |
| | | | | 719/315 |
| 2008/0222734 | A1* | 9/2008 | Redlich | H04L 63/02 |
| | | | | 726/26 |
| 2009/0328159 | A1* | 12/2009 | Luo | H04N 1/446 |
| | | | | 726/4 |
| 2010/0146013 | A1* | 6/2010 | Mather | G06F 16/10 |
| | | | | 707/803 |
| 2010/0250497 | A1* | 9/2010 | Redlich | H04L 63/0227 |
| | | | | 707/661 |
| 2012/0185759 | A1* | 7/2012 | Balinsky | G06Q 10/103 |
| | | | | 715/209 |
| 2012/0330887 | A1* | 12/2012 | Young | G06F 16/275 |
| | | | | 707/610 |
| 2014/0331335 | A1* | 11/2014 | Deschenes | G06F 16/9554 |
| | | | | 726/28 |
| 2014/0372478 | A1 | 12/2014 | Zhao | |
| 2015/0081681 | A1 | 3/2015 | Vohra et al. | |
| 2017/0180606 | A1* | 6/2017 | Zehler | G06V 30/40 |
| 2017/0359183 | A1* | 12/2017 | Tenenboym | H04L 9/3268 |
| 2018/0122498 | A1* | 5/2018 | Bridges | G06F 40/186 |
| 2019/0228186 | A1* | 7/2019 | Atreya | G06F 21/556 |
| 2020/0186361 | A1* | 6/2020 | Almgren | H04L 9/3242 |
| 2020/0267282 | A1* | 8/2020 | Tong | G06F 21/725 |

OTHER PUBLICATIONS

Wiebe et al., "Creating Subjective and Objective Sentence Classifiers from Unannotated Texts," Sixth International Conference on Intelligent Text Processing and Computational Linguistics (CICLing—2005), 12 pages. https://people.cs.pitt.edu/~wiebe/pubs/papers/cicling05.pdf.

Bird et al., "Extracting Information from Text," Chapter 7, (Natural Language Processing with Python), NLTK Book, Printed: Sep. 23, 2019, 20 pages, http://www.nltk.org/book/.

Jawaharlal et al., "Comparison and Validation of Digital Content Using Contextual Analysis," U.S. Appl. No. 16/195,961, filed Nov. 20, 2018.

* cited by examiner

CONTENT VALIDATION DOCUMENT TRANSMISSION

BACKGROUND

The present disclosure relates to improved network performance, and more specifically, to improving network performance by detailed document authentication.

Document security may operate by validating documents that are shared between multiple users. Validating documents may be useful to identify a document that has been tampered with or otherwise altered. Upon identification of an altered document, a request for retransmission of the document may occur based on the assumption that the document was tampered with by a third party. In some instances, request and retransmission may cause excessive network usage.

SUMMARY

According to embodiments of the disclosure, disclosed is a method, system, and computer program product. A document is received by a first computer system from a second computer system. The document is received through a network. A document level security code is received by the first computer system through a second network. A content level security code is received by the first computer system and through the second network. A first validation operation is performed by the first computer system. The performance is based on the document level security code. The first computer system determines the document is an altered document. The determination is based on the performance of the first validation operation. A second validation operation is executed on the altered document. The second validation operation is executed by the first computer system and in response to the determination that the document is an altered document. An alteration status of the document is detected by the first computer and based on the second validation operation on the altered document.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to improved network performance; more particular aspects relate to improving network performance by detailed image authentication. While the present disclosure is not necessarily limited to such applications, various aspects of the disclosure may be appreciated through a discussion of various examples using this context.

Today, digital communication may be more important to facilitate work from disparate geographic locations. Multiple parties may want to share information and collaborate. To facilitate these sharing scenarios, the ability to send information, such as documents and pictures, can be possible through network transmission. The network transmission of documents may enable the operation and exchange of information at a faster pace than using conventional postal mail, which may be useful in time-dependent scenarios.

While useful with regard to time efficiency, transmitting documents over networks can make the documents susceptible to tampering. Accordingly, using effective tampering prevention techniques can be useful when transmitting documents over networks. Tampering may include a man-in-the-middle attack. For example, a third party may obtain one or more documents in transit and alter the documents before the documents are sent to the intended recipient. This may lead to a failed transaction, such as when a document is altered such that useful meaning cannot be derived. This may also lead to an improper transaction, such as when the meaning of a document is altered, and a party mistakenly relies on the altered document.

One area of concern is the realm of image-based documents (e.g., scanned documents). In image-based documents, various documents are scanned and stored in a content repository, sent as an attachment, or embedded in other communications (e.g., email). Scanning may be a process of digitization or other relevant operation to represent a document as an image. The process of scanning a document changes the information of the document into an image that is made up of pixels. Once documents including text, pictures, and/or drawings are scanned into electronic images, the electronic images may be susceptible to tampering, such as with a deliberate, man-in-the-middle attack.

To detect and prevent unauthorized alteration to documents, one or more security techniques may be used. Security techniques and security functions, as defined herein, may include relevant validation, verification, and/or authentication operations to determine if a document has been altered. One technique used to detect unauthorized interceptions of documents, including image-based documents, is performance of a one-way function (e.g., hashing). A one-way function may be a function used to create a number that is easy to generate for a given data set, but extremely difficult to replicate for a different data set. The one-way function may be done to a document both before transmission and after to ensure that nothing was lost or altered in transit. Upon detection of an alteration of a document, the recipient may notify the sender and the document may be resent.

The various security techniques may contain certain drawbacks. For example, there are situations where data transmission leads to an accidental loss of content. Though there are multiple security techniques, e.g., one-way functions and hashing operations, these security techniques operate at a coarse level. The coarse level of operation means that the security techniques can detect when a document—as a whole—has been altered. However, such coarse operations may erroneously identify unaltered documents as altered. For example, sometimes due to network issues (e.g., packet loss, bit scrambling) a document may be altered without loss of some or all of the meaning of the document. Some security techniques may rely on a one-way function that produces the same value given only for the same data of an entire document. This may lead to false positives. A false positive can mean that the security technique identifies the document as altered, even though there is no substantive change. As a result of a false positive, there may be needless or excess requests and retransmissions of documents. The repeated requests as well as the repeated retransmission of documents may cause a loss in available network infrastructure and resources.

A content-based validation (CBV) system may overcome the technical problems related to the security techniques of digital documents and image-based documents. The CBV system may include determining and detecting relevant critical content within a document. The content of the document may be the actual information or context of information depicted within a document. For example, only certain critical sections of a document may contain text, handwriting, or other relevant information. These critical sections may be useful for the meaning of the document to be preserved. On the other hand, certain sections of the document may be non-critical (e.g., header images, graphs, unrelated information). The non-critical sections may also be subject to altered data, but the alteration of a non-critical section may not result in a loss of meaning to the document.

The CBV system may perform a security function upon critical content identified within a document. The CBV system may further transmit a verification code for the document and a verification code for the content of a document. Recipients may also implement a CBV system to determine when a document has been altered without a change to the context of the document or without a change to the content of the document. The practical advantages of the CBV, are that the CBV may reduce the frequency of retransmission due to false positives, or due to document transmission that alter non-critical information of areas of a document. The identification of non-critical information by the recipient may cut down on requests being sent to the sender for retransmission, and the retransmissions for false positives; in all cases a saving of network bandwidth may be achieved.

The CBV system may validate that the content of a document has not changed even when certain alterations or updates are performed to a document. Certain documents may have subsets of the document (e.g., pictures) altered through natural operations (e.g., adjusting compression ratios). A CBV system may permit a recipient to determine that the alteration is unrelated to a third-party tampering. For example, if a hash of only text of a document image is validated by a recipient, any modifications to other elements of the document may be detected and determined to not be a content modification, and consequently, not context-level modification to the meaning.

The CBV system may identify images in a digital content item to be transmitted and separate context-oriented information and non-context-oriented information in the digital content item at both a sender as well as receiver. The CBV system may derive features from the context-oriented images based on a predefined template for each scenario. The CBV system may compare the whole digital content item and the information (e.g., the context oriented and non-context-oriented information). The CBV system may use one or more security techniques after performing the contextual analysis of the context-oriented image content at a sender and a receiver. In some embodiments, the CBV system may identify and discard the digital image on the receiver end if there is change in the content of the image and not just the entirety of the image.

The CBV system may also verify the content of documents where actual alterations have occurred. For example, a document in image format may go through one or more translations (e.g. compressions, image format conversions, color space changes). The value of existing security codes may change when even if the pixel data, color histograms, textures, shapes change without any content or context getting changed. These changes may be innocuous changes, and under existing security operations may result in unnecessary retransmissions, whereas determining the values of the content and providing security codes for the content may also alleviate these retransmissions.

Figure 1:
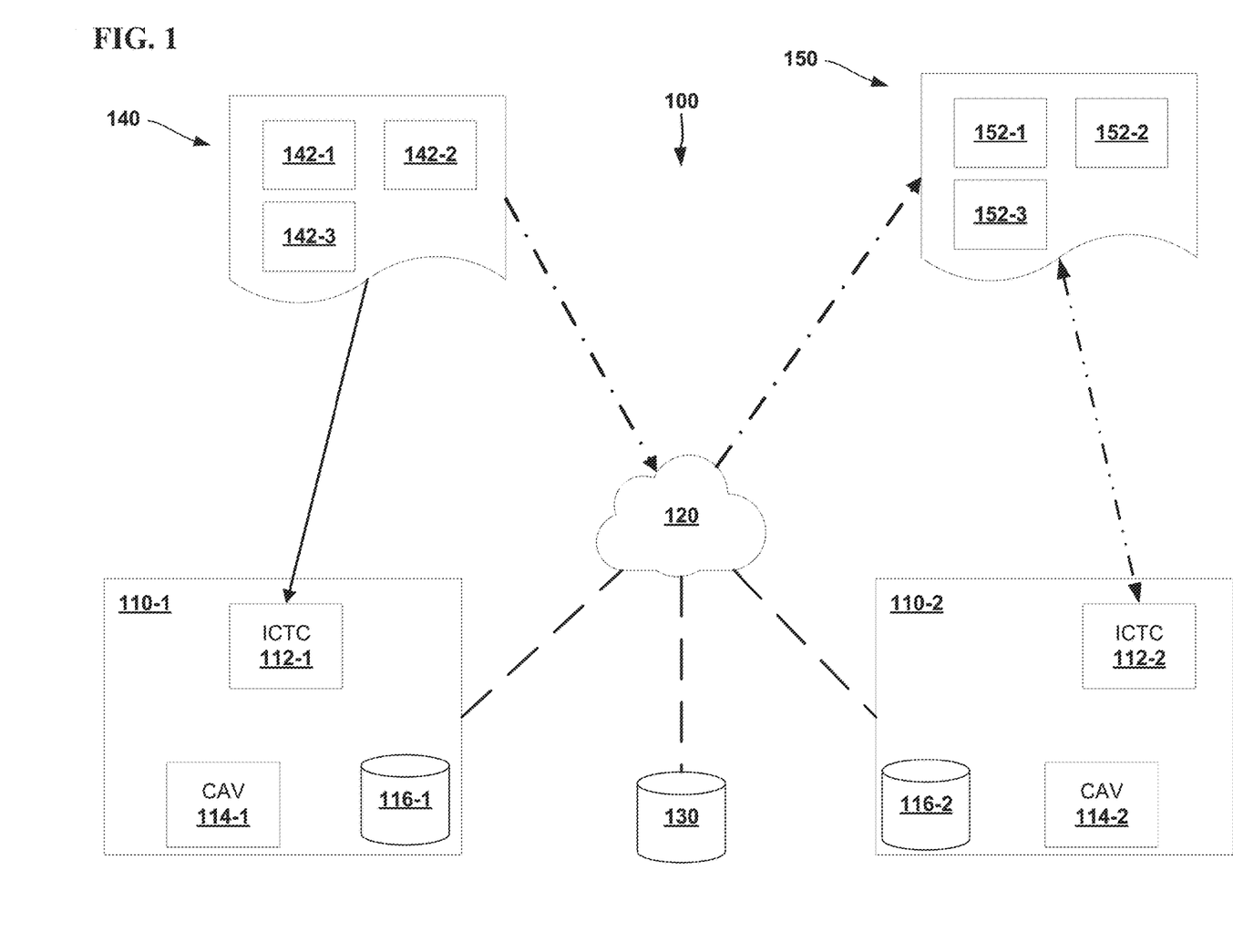
FIG. 1 depicts an example content-based validation system consistent with some embodiments of the disclosure.

FIG. 1 depicts an example content-based validation system 100 consistent with some embodiments of the disclosure. The CBV system 100 may operate in a computing environment that includes a plurality of senders and receivers that send and receive information through a plurality of computer systems including a first computer system 110-1 and a second computer system 110-2 (collectively, computer systems 110). The CBV system 100 may also include a network 120 for communicatively coupling one or more components of the system 100. The CBV system 100 may also include a context master dictionary 130.

In some embodiments, one or more rules, pre-defined classifiers may be distributed from the context master dictionary 130 to the first computer system 110-1 and the second computer system 110-2. For example, the context master dictionary 130 may be a central datastore (e.g., database) for storing pre-defined classifiers. The context master dictionary 130 may also include a computer system and may comprise hardware, software or some combination. The context master dictionary 130 may synchronize the rules and pre-defined classifiers with other context dictionaries, such that rules and operations achieve the same result.

Figure 4:
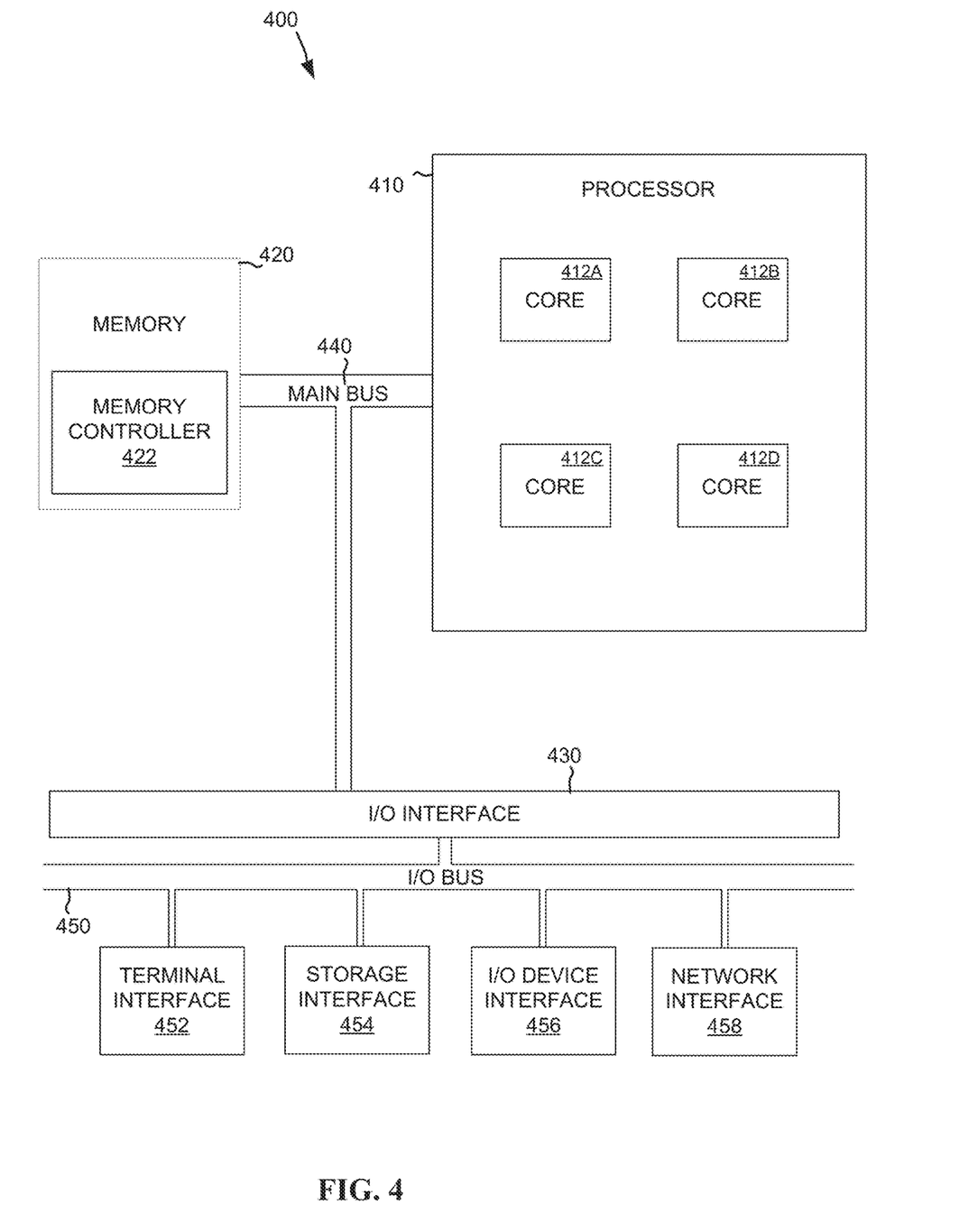
FIG. 4 depicts the representative components of an example computer system that may be used, in accordance with some embodiments of the present disclosure.

The first computer system 110-1 may be a computer system (e.g., computer, smartphone, server, computing device) configured to perform one or more operations of the CBV. FIG. 4 depicts an example computer system 400 configured consistent with some embodiments of the disclosure. Referring back to FIG. 1, the first computer system 110-1 may include the following: a digital image classifier and image converter (ICTC) 112-1; a context analyzer and validator (CAV) 114-1; and a first context dictionary 116-1. The first context dictionary 116-1 may be a database or other relevant datastore for storing records.

The ICTC 112-1 may be hardware, software, firmware, or a combination configured to perform one or more operations regarding documents sent to and received from other components of the system 100 (e.g., the second computer system 110-2). The ICTC 112-1 may be configured to identify certain areas, subsets, or portions of documents to be transmitted and received. For example, certain documents may contain images.

The ICTC 112-1 may include multiple modules (e.g., hardware components, software subroutines). For example, the ICTC 112-1 may include an image identifier, an image to text converter, and an image classifier. The image identifier may identify the type of document, digital content, or document scan (e.g., a digital scan of a check, a mixed media document, a digital text document). The image identifier may separate or exclude pictures or other human-identifiable images from digital representations of text. The image to text converter operates on the document to convert or otherwise transform the image data (e.g., pixel values) of the document into textual information. The image classifier may be further configured to generate groups of context-oriented information and separate the context groups from the non-context information.

The ICTC 112-1 may use one or more templates and classifiers for deriving features and identifying features of context portions of an image. The templates and classifiers may be stored in the first context dictionary 116-1. In some embodiments, the first context dictionary 116-1 may send information to and retrieve information from the context master dictionary 130. For example, templates and classifiers may be stored in the context master dictionary 130 and the first context dictionary 116-1 may inherit the templates and features of the context master dictionary.

The CAV module 114-1 may be hardware, software, firmware, or a combination configured to perform one or more operations regarding documents sent to and received from other components of the system 100 (e.g., the second computer system 110-2). The CAV module 114-1 be configured to analyze documents and determine the presence of context sections (e.g., critical areas, recognizable areas of context, areas containing text), and non-context sections. The CAV module 114-1 may be configured to generate security codes by analyzing documents and performing security functions.

The CAV module 114-1 may include multiple modules (e.g., hardware components, software subroutines). For example, the CAV module 114-1 can include a context analyzer and a security module. The context analyzer may operate on the converted textual information. For example, the context analyzer may identify, separate, segregate collect, or otherwise establish the context or classification of the textual information converted from the image data of the document. For example, captions, fields, forms (both the labeling and the filled-out information of a form), or other areas of a document. The context analyzer may access the pre-defined classifiers in the first context dictionary 116-1 or the context master dictionary 130. The security module of the CAV module 114-1 may operate to generate secure codes for documents based off detected context sections and non-context sections. The security module may also operate by verifying a secure code (e.g., receiving codes from second computer system 110-2).

The second computer system 110-2 may be a computer system (e.g., computer, smartphone, mobile device, server, computing device) configured to perform one or more operations of the CBV. FIG. 4 depicts an example computer system 400 configured consistent with some embodiments of the disclosure. The second computer system 110-2 may include the following: a digital image classifier and image converter (ICTC) module 112-2; a context analyzation and validation (CAV) module 114-2; and a second context dictionary 116-2. The second context dictionary 116-2 may be a database or other relevant datastore for storing records.

The ICTC 112-2 may be hardware, software, firmware, or a combination configured to perform one or more operations regarding documents sent to and received from other components of the system 100 (e.g., the first computer system 110-1). The ICTC 112-2 may be configured to identify certain areas, subsets, or portions of documents to be transmitted and received. For example, certain documents may contain images.

The ICTC 112-2 may comprise multiple modules (e.g., hardware components, software subroutines). For example, an image identifier, an image to text converter, and an image classifier. The image identifier may identify the type of document, digital content, or document scan (e.g., a digital scan of a check, a mixed media document, a digital text document). The image identifier may separate or exclude pictures or other human-identifiable images from digital representations of text. The image to text converter operates on the document to convert or otherwise transform the image data (e.g., pixel values) of the document into textual information. The image classifier may be further configured to generate groups of context-oriented information and separate the context groups from the non-context information.

The ICTC 112-2 may use one or more templates and classifiers for deriving features and identifying features of context portions of an image. The templates and classifiers may be stored in the second context dictionary 116-2. In some embodiments, the second context dictionary 116-2 may send information to and retrieve information from the context master dictionary 130. For example, templates and classifiers may be stored in the context master dictionary 130 and the second context dictionary 116-2 may inherent the templates and features of the context master dictionary.

The CAV module 114-2 may be hardware, software, firmware, or a combination configured to perform one or more operations regarding documents sent to and received from other components of the system 100 (e.g., the first computer system 110-1). The CAV module 114-2 be configured to analyze documents and determine the presence of context sections (e.g., critical areas, recognizable areas of context, areas containing text), and non-context sections. The CAV module 114-2 may be configured to generate security codes by analyzing documents and performing security functions.

The CAV 114-2 may comprise multiple parts (e.g., hardware components, software subroutines), for example, a context analyzer and a security validator. The context analyzer may operate on the converted textual information. For example, the context analyzer may identify, separate, segregate collect, or otherwise establish the context or classification of the textual information converted from the image data of the document. For example, captions, fields, forms (both the labeling and the filled-out information of a form), or other areas of a document. The context analyzer may operate by accessing the pre-defined classifiers in the second context dictionary 116-2 or the context master dictionary 130. The security module of the CAV module 114-2 may operate to generate secure codes for documents based off detected context sections and non-context sections. The security module may also operate by verifying a secure code (e.g., receiving codes from first computer system 110-1).

The CBV system 100 may make use of image analysis. In some embodiments, the ICTC 112-1 and ICTC 112-2 may operate by performing relevant image processing techniques. In some embodiments, other components of the CBV system 100 map operate by performing relevant techniques. In some embodiments, objects may be identified using an object detection algorithm, such as region-based convolutional neural networks (R-CNN), you only look once (YOLO), single shot detector (SSD), scale-invariant feature transform (SIFT), Hog features, or other machine learning and/or deep learning object detection algorithms. The output of the object detection algorithm may include one or more identities of one or more respective objects with corresponding match certainties. For example, by analyzing a teleconferencing scene that includes a person, the person may be identified using a relevant object detection algorithm.

In some embodiments, characteristics of objects may be determined or approximated using photogrammetry techniques. As an example, if a user provides an image of a basket, the diameter, depth, thickness, etc., of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., two eyes), colors of object, and/or other attributes of objects. In some embodiments, an output list including the identity and/or characteristics of objects (e.g., cotton shirt, metal glasses, etc.) may be generated. In some embodiments, the output may include an indication that an identity or characteristic of an object is unknown. In these instances, additional input data for the object may be requested to be analyzed such that the identity and/or characteristics of objects may be ascertained. For example, a prompt may be made to provide features of the face such that objects in their surrounding may be recognized. In some embodiments, various objects, object attributes, and relationships between objects (e.g., hierarchical and direct relations) may be represented within a knowledge graph (KG) structure. Objects may be matched to other objects based on shared characteristics (e.g., graphs and related caption text describing or outlining a graph), relationships with other objects (e.g., columns, headings, titles, body sections), or objects belonging to the same class (e.g., a column of text and other text columns).

In some embodiments, CBV system 100 may make use of nonce, word, sentence, or other natural language processing techniques. A natural language processing system may include various components (not depicted) operation through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from document images. Various components (not depicted) of the natural language processor may include, but are not limited to, a tokenizer, a part-of-speech (POS) tagger, a semantic relationship identifier, and a syntactic relationship identifier.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., previous scanned documents, information from a context diction). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a document image at the natural language processing system, the natural language processor may output parsed text elements from the post as data structures in preparation of generating a security code for later validation. In some embodiments, a parsed text element may be represented in the form of a parse tree or other graph structure. To generate the parsed text element, the natural language processor may trigger computer modules including the tokenizer, the part-of-speech (POS) tagger, the semantic relationship identifier, and the syntactic relationship identifier.

An example of operation of the CBV system 100 may be explained from input document 140. Input document 140 may be received from another computer system, client, user, or the like for transmission through network 120. The input document 140 may be destined for transmission to computer 110-2. The ICTC 112-1 may identify areas 142-1, 142-2, and 142-3 (collectively 142), within document 140. The areas 142 may contain various content. For example, area 142-2 may be a picture of wildlife preserve, and areas 142-1 and 142-3 may contain various legal agreements for a contract to purchase the preserve.

The ICTC 112-1 may scan and identify the various areas 142 as well as segment the areas. For example, areas 142-1 and 142-3 may include content for which context can be establish. Further, area 142 may not contain content for which context can be established. The ICTC 112-1 may pass the area 142 to the CAV module 114-1. The CAV module 114-1 may generate a first content level security code for area 142 based on the pixel values of area 142. The ICTC 112-1 may tag areas 142-1 and 142-3 as capable of determining context and may pass the tagged areas to the CAV module 114-1. The CAV module 114-1 may generate a second content level security code for area 142-1 and a third content level security code for area 142-3.

The first computer 110-1 may also generate a document level security code for document 140. The first computer 110-1 may generate a copy 150 of document 140 for transmission to the second computer 110-2. The first computer 110-1 may send the copy 150, the document level security code, and the three content level security codes that represent each of the areas 142 of the document 140 to the second computer 110-2 via the network 120.

Continuing the example, the copy 150 of the document (document copy) may be received by the second computer system 110-2 from the first computer system 110-1 through network 120 along with the document level security code and the three content level security codes. The ICTC 112-2 may operate by analyzing the received document copy 150 and identifying areas 152-1 and 152-3 as areas where context can be established.

The CAV module 114-2 may generate validation codes for the content area 152-2 and the content areas 152-1 and 152-3. The CAV module 114-2 may perform analysis using the second context dictionary 116-2 that contains the same templates and criteria as the first context dictionary 116-1 the CAV module 114-1 used to generate the document level security code and the content level security codes. If there is an alteration to the document, the document level security code derived by the CAV module 114-2 may not match the document level security code.

The CAV module 114-2 may still validate the content of the document copy 150 even in cases where the document was determined to be altered. The CAV module 114-2 may generate the content level security codes and compare them with the three content level security codes. If the second area 152-2 of the document copy 150 has a content level security code that does not match there is an indication that the document was altered. If the first area 152-1 or the second area 152-3 of the document copy 150 has content level security codes that do not match the processing done by the CAV module 114-2, then it may be determined that the document was tampered with and a retransmission request may be sent to the first computer 110-1.

Figure 2A:
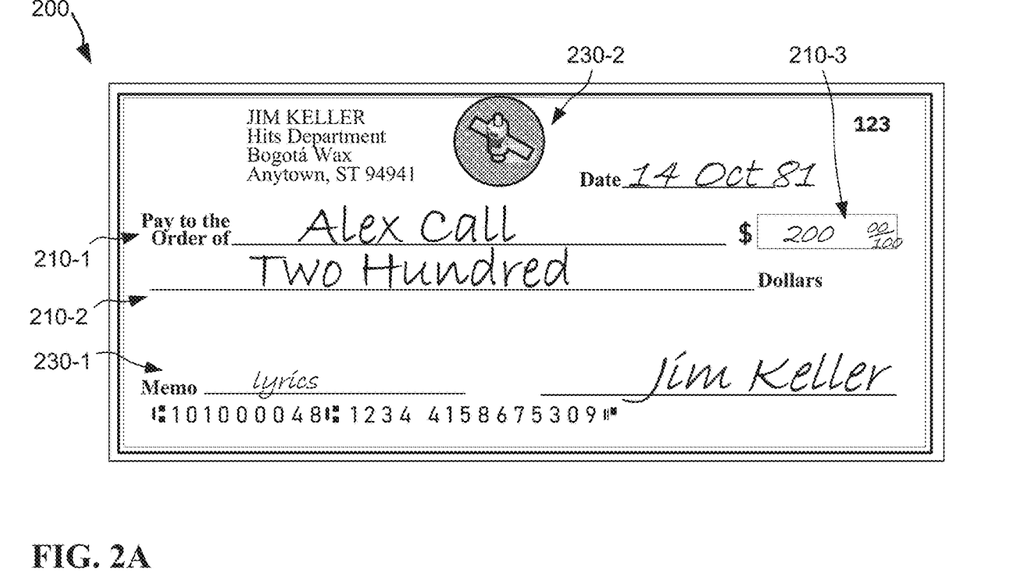
FIG. 2A depicts an example document containing content before transmission, consistent with some embodiments of the disclosure.

FIG. 2A depicts an example document 200 containing content before transmission, consistent with some embodiments of the disclosure. The document 200 may be a scanned image of a document for a transaction between two parties. The document 200 may contain a plurality of areas, including the following: a first area 210-1, a second area 210-2, a third area 230-1, a fourth area 230-2, and a fifth area 210-3. Areas 230-1 and 230-2 may be identified as non-critical areas 230 by a CBV system (not depicted). Areas 210-1, 210-2, and 210-3 may be identified as critical areas 210 by the CBV system.

The CBV system may generate one or more content level security codes based on the text depicted by the document 200. For example, the CBV system may generate hashes for areas 210-1, 210-2, 210-3, 230-1, and 230-2. As the hashes of the text are based on image and text analysis any alterations of the textual content within the regions of the document 200 may be identified. The CBV system may generate one or more content level security codes based on the images depicted by the document 200. For example, the CBV system may generate a hash for fourth area 230-2 based on the pixel values of fourth area 230-2. The CBV system may analyze document 200, identify critical areas and non-critical areas, and generate the content level security codes based on a set of rules (e.g., pre-defined classifiers, NLP rules) stored in a first context dictionary (not depicted). The first context dictionary may be synchronized with receivers, such that the set of rules are used by receivers.

The CBV system may send a content level security code to a second computer of the CBV system (not depicted). In some embodiments, the CBV system may also send a document level security code (e.g., a hash of the document), along with content level security code. The content level security code may be an aggregation of the one or more content level security codes that were generated. For example, an aggregation may be a summation of the hash values generated for 210-1, 210-2, 230-1, 210-3, and 230-2. Though an aggregation of the hash values was used as an example, it should be apparent to one of skill in the art that an aggregation of multiple one-way functions may be any relevant aggregation function.

Figure 2B:
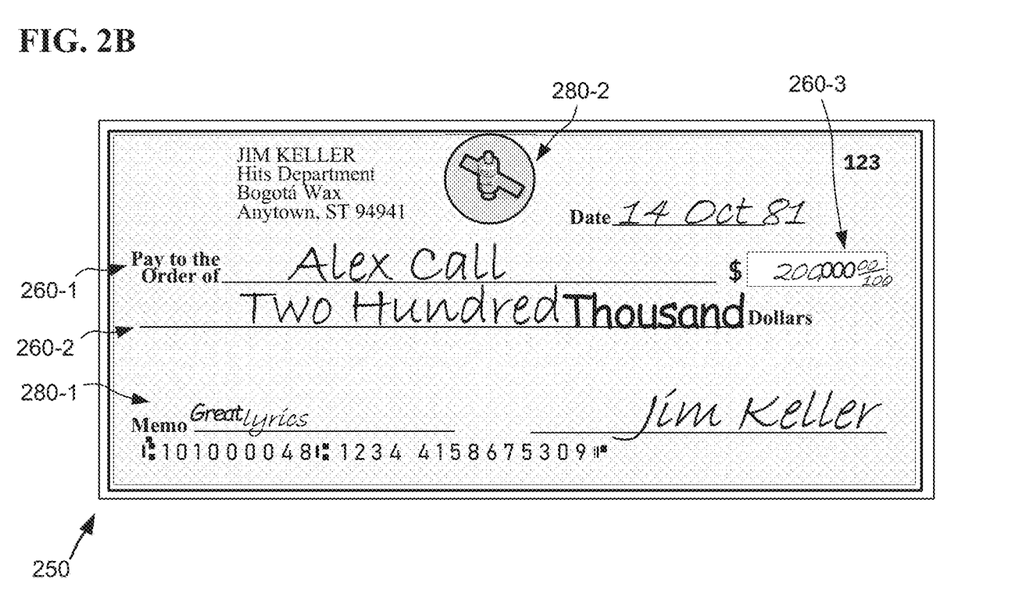
FIG. 2B depicts an example document copy containing content after transmission, consistent with some embodiments of the disclosure.

FIG. 2B depicts an example document copy 250 containing content after transmission, consistent with some embodiments of the disclosure. The document copy 250 may be a copy of the scanned image of document 200 received by a second of two parties. The document copy 250 may contain multiple areas, including the following: a first area 260-1, a second area 260-2, a third area 280-1, a fourth area 280-2, and a fifth area 260-3. Areas 280-1 and 280-2 may be identified as non-critical areas 280 by a second computer of CBV system (not depicted). Areas 260-1, 260-2, and 260-3 may be identified as critical areas 260 by the second computer. Operations of the second computer may be based on a second context dictionary containing the same set of rules as the set of rules in the first context dictionary described in FIG. 2A.

The second computer may also receive a document level security code and one or more content level security codes along with document copy 250. The second computer may perform a validation operation on the document copy 250. For example, the validation operation may include performing a document level hash on document copy 250 and comparing the resultant hash value to that received along with document copy 250. If the result of the validation operation is that the document has been altered (e.g., the received and computed hash values do not match), then the second computer may execute a second validation operation on the document copy 250. For example, the second computer may computer hash values for each of the critical areas 260 and non-critical areas 280 to determine a content level validation code. The second computer may compare the content level security codes to the content level validation code.

In a first example, based on comparison an analysis, the second computer may identify that the fourth area 280-2 may have been altered. In the document copy 250 depicted in FIG. 2B, the alteration is due to a scanning and compression process and as such it does not constitute a content-level alteration. If this is the only alteration, the altered document (e.g., document copy 250) may be passed on to a user.

In a second example, based on comparison an analysis, the second computer may identify that the third area 280-1 may have been altered. In the document copy 250 depicted in FIG. 2B, the alteration is due to a third party altering the "Memo" line and as such it does constitute a content-level alteration. The second computer may perform contextual analysis of document copy 250 and may determine based on pre-defined criteria that the content alteration of the third area 280-1 is not an alteration of the context or meaning of the document. If this is the only alteration, the altered document (e.g., document copy 250) may be passed on to a user.

In a third example, based on comparison an analysis, the second computer may identify that the second area 260-2 may have been altered. In the document copy 250 depicted in FIG. 2B, the alteration is due to a third party altering the "Dollars" line and as such it does constitute a content-level alteration. The second computer may perform contextual analysis of document copy 250 and may determine based on pre-defined criteria that the content alteration of the second area 260-2 is an alteration of the context or meaning of the document. If this is the only alteration, the altered document (e.g., document copy 250) may be flagged as a change in the context of the document, and a sending computer may be notified to resend the document.

In a third example, based on comparison an analysis, the second computer may identify that the fifth area 260-3 may have been altered. In the document copy 250 depicted in FIG. 2B, the alteration is due to a third party altering the "$" box and as such it does constitute a content-level alteration. The second computer may perform contextual analysis of document copy 250 and may determine based on pre-defined criteria that the content alteration of the fifth area 260-3 is an alteration of the context or meaning of the document. If this is the only alteration, the altered document (e.g., document copy 250) may be flagged as a change in the context of the document, and a sending computer may be notified to resend the document.

Figure 3:
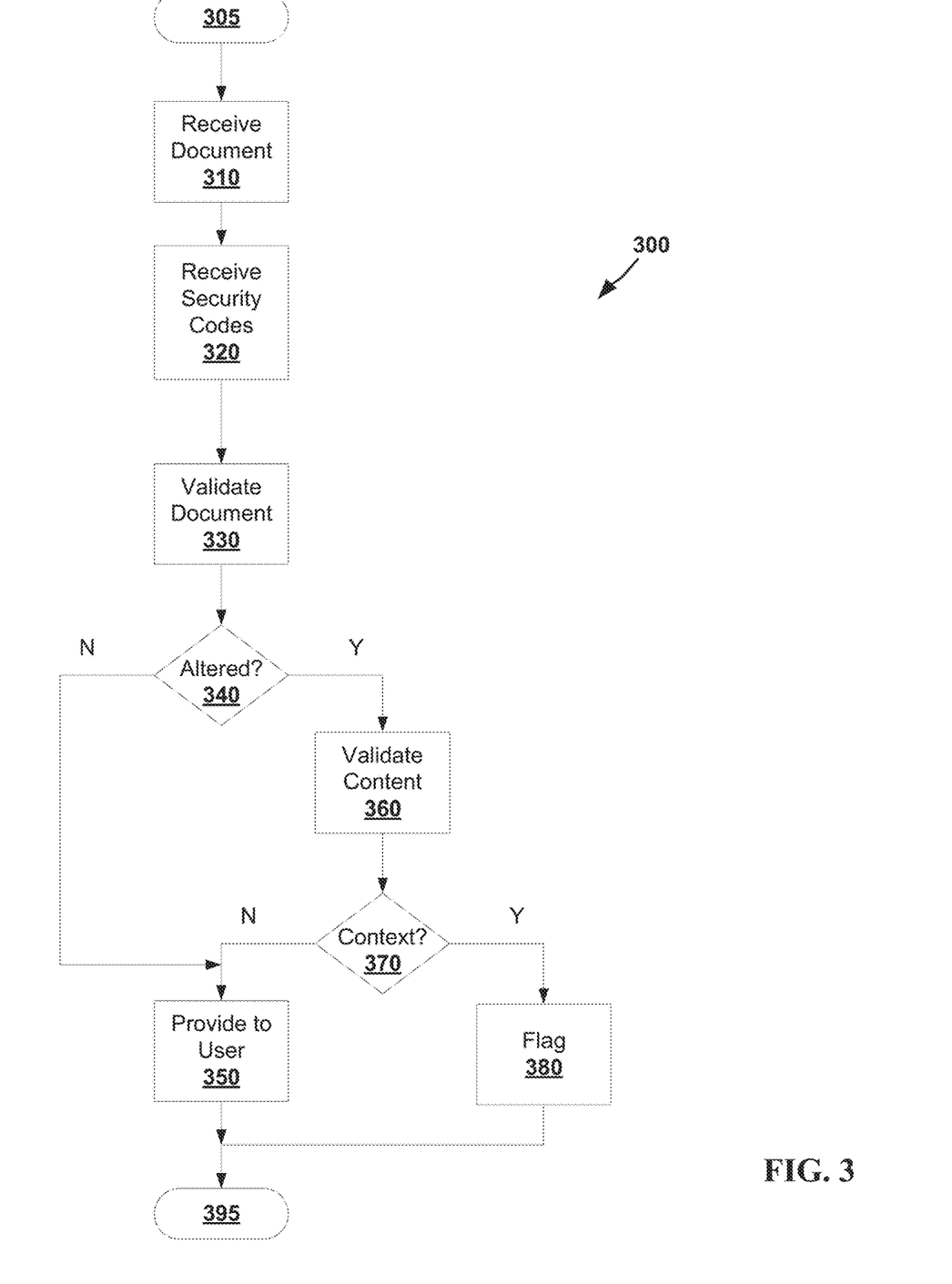
FIG. 3 depicts an example method of performing validation of documents, consistent with some embodiments of the disclosure.

FIG. 3 depicts an example method 300 of performing validation of documents, consistent with some embodiments of the disclosure. Method 300 may be performed by a CBV system consistent with the disclosure. Method 300 may be performed by a recipient of a document. Method 300 may be performed by a computing device (e.g., a desktop, a laptop, a smartphone, a PDA). Method 300 may be performed by a computer system (e.g., a computer system 400 depicted in FIG. 4). One or more operations of method 300 may be performed repeatedly, such as validating content elements.

Method 300 begins at start 305, where a document is received at 310. The received document may be an image-based document. For example, the received document may be a newspaper scan, or a digitized contract. The document may be received by polling a cache, bus, or a network subsystem for the arrival of documents. The document may be received from a second computer system (e.g., a sender computer system). The document may be received in response to a request by a first computer system. For example, the first computer may send a request for the document from a remote server at a geographic location disparate from the first computer.

At 320, a set of security codes may be received. The set of security codes may include one or more codes that are used for validation of the received document. In some embodiments, the set of security codes includes a document level security code and one or more content level security codes. The security codes may be generated by a second computer system before being received by the CBV system. The security codes may be generated by a relevant security function. The security codes may be generated based on image analysis, image to text conversion, natural language processing, and language content analysis.

At 330 the document may be validated. The document may be validated by performing a validation operation upon the received document. Performing the validation operation may include determining a validation status (e.g., an innocuous alteration, a tampering, a malicious alteration). Performing the validation operation may include executing a document level security function against the entire document to generate a document level validation code. Performing the validation operation may also include comparing the document level validation code to the received document level security code. Performing the validation operation may also include determining that the document is altered. For example, when the document level validation code is the same as the received document level security code, the document is not altered. If the document is not altered, at 340, the document may be provided to the user at 350, and method 300 ends at 395.

If the document is altered, at 340, the content of the document may be validated at 360. The content may be validated by analyzing the document for one or more context-based content sections and non-context-based content sections. Non-context-based content sections may be subsets of the document that contain, pictures, graphs, patterns, or other non-textual information. Context-based content sections may include paragraphs, forms, fields, or other textual information. Context-based content sections may be determined by identifying sections that match on a textual level to pre-defined classifiers stored in a context dictionary. Analyzing the document may be performed in a pre-determined order. For example, a sender may create content level security codes by beginning a scan for content from right to left and bottom to top of the image. Likewise, a receiver may validate the content by analyzing the document in the same predefined right to left and bottom to top direction. Consequently, a third identified content section may be the same section of the sent document and the document received at 310.

For each content section detected from the analysis of the document, the content section may be validated. The content may be validated by executing a validation operation on each of the context-based content sections and the non-context-based content sections. For example, hashing the pixel data of non-context-based content sections, and hashing the textual information of the context-based content sections. In some embodiments, the content may be validated by executing a validation operation on each of the context-based content sections. Executing the validation operation may include performing a content level security function against each identified content section of the document to generate content level validation codes. Executing the validation operation may include comparing the content level validation codes to the received document level security codes. Executing the validation operation may include determining that the altered section is a context-based content section. Executing the validation operation may also include determining that the altered section is a context-based content section.

Executing the validation operation may also include determining that an altered section is a malicious alteration. For example, a price section of a document may be defined as a no alteration tolerance section in a pre-defined classifier of a context dictionary. Upon detecting any alteration to the section, the CBV system may determine that a context alteration has occurred.

Executing the validation operation may also include determining that an altered section is innocuously altered. For example, by comparing the alterations of a filled in form by adding a "." to the end of a statement, but without otherwise altering the filled in form may be innocuously altered. The determination of whether an alteration is innocuous may be based on the pre-defined classifiers stored in the context dictionary.

Executing the validation operation may include determining that the altered section is a critical context-based content section. For example, a document may be a newspaper scan that includes an advertisement with concrete terms and a cross-word puzzle with fillable blanks. During analysis of the newspaper, and as part of validating the content, at 360, it may be determined that the crossword was filled out with handwritten letters. The handwritten information may be determined to be an innocuous context alteration as the pre-defined classifiers may indicate this section of the document as context-innocuous. Likewise, during analysis it may be determined that the advertisement with concrete terms is a critical content section. Based on the pre-defined classifiers it may indicate that this section of the document is a critical content section and a modification to the terms of the advertisement may be a critical context alteration.

If a content section has an altered context, at 370, the document may be flagged at 380. In some embodiments, if a no alteration tolerance content section has an altered context, at 370, the document may be flagged at 380. In some embodiments, if an identified critical content-section is altered, at 370, the document may be flagged at 380. Flagging the document may include transmitting a message to the sender that includes a request for resubmission. The message may also include an identification of the content section that was altered. If there was not an altered context of any of the content sections at 370 (or after the document was flagged at 380) method 395 ends.

If the document is not altered, at 340, the document may be provided to the user at 350, and method 300 ends at 395.

FIG. 4 depicts the representative components of an example computer system 400 (alternatively, computer) that may be used, in accordance with some embodiments of the present disclosure. It is appreciated that individual components may vary in complexity, number, type, and\or configuration. The particular examples disclosed are for example purposes only and are not necessarily the only such variations. The computer system 400 may comprise a processor 410, memory 420, an input/output interface (herein I/O or I/O interface) 430, and a main bus 440. The main bus 440 may provide communication pathways for the other components of the computer system 400. In some embodiments, the main bus 440 may connect to other components such as a specialized digital signal processor (not depicted).

The processor 410 of the computer system 400 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or more methods consistent with embodiments of the present disclosure. In some embodiments, the computer system 400 may contain multiple processors 410. In some embodiments, the computer system 400 may be a single processor 410 with a singular core 412.

The memory 420 of the computer system 400 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 400—including but not limited to the memory 420, the processor 410, and the I/O interface 430—may communicate failures and changes to one or more components to a hypervisor or operating system (not depicted). The hypervisor or the operating system may allocate the various resources available in the computer system 400 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a first computer system and through a first network, an unencrypted document from a second computer system, wherein the document is a self-contained singularly stored document;
   receiving, by the first computer system and through a second network, a document level security code, wherein the document level security code is generated before any alteration to the document;

receiving, by the first computer system and through the second network, a content level security code, wherein the content level security code includes information to validate only a subset of the document, wherein the content level security code is generated before any alteration to the document;

performing, by the first computer system and based on the document level security code, a first validation operation;

determining, by the first computer system and based on the performing the first validation operation, the unencrypted document is an altered document;

executing, by the first computer system and in response to determining the unencrypted document is an altered document, a second validation operation on the altered document, wherein the second validation operation is based on a context dictionary that contains one or more criteria and one or more templates; and detecting, by the first computer system and based on the second validation operation on the altered document, an alteration status of the document.

2. The method of claim 1, wherein:
the document includes one or more critical content sections;
the alteration status of the document is innocuous data loss; and
the method further comprises:
presenting, by the first computer system, the altered document.

3. The method of claim 1, wherein the document includes one or more critical content sections, and wherein the alteration status of the document is that the one or more critical content sections is altered, and wherein the method further comprises:
generating, by the first computer system, a response, wherein the response includes a request to resend the document; and
transmitting, to the second computer system, the response.

4. The method of claim 1, wherein the document is an image document comprising pixels, and wherein the executing the second validation operation includes performing a one-way function on a subset of the pixels.

5. The method of claim 4, wherein the subset of the pixels includes one or more critical content sections, and wherein the method further comprises:
identifying, before performing the one-way function and by the first computer system, the one or more critical content sections.

6. The method of claim 5, wherein the identifying the one or more critical content sections includes accessing a first content datastore, the first content datastore containing one or more first pre-defined classifiers.

7. The method of claim 6, wherein the second computer system generates the content level security code by accessing a second content datastore, the second content datastore containing one or more second pre-defined classifiers.

8. The method of claim 7, wherein the one or more first pre-defined classifiers and the one or more second pre-defined classifiers are distributed from a central content datastore, and wherein the one or more first pre-defined classifiers are the same as the one or more second pre-defined classifiers.

9. The method of claim 1, wherein the first network and the second network are the same network.

10. The method of claim 1, wherein the document includes one or more critical content sections, and wherein the content level security code is based on a one or more content element security codes, and wherein the one or more content element security codes correspond to the one or more critical content sections.

11. A system, the system comprising:
a memory, the memory containing one or more instructions; and
a processor, the processor communicatively coupled to the memory, the processor, in
response to reading the one or more instructions, configured to:
receive, by a first computer system and through a first network, an unencrypted document from a second computer system, wherein the document is a self-contained singularly stored document;
receive, by the first computer system and through a second network, a document level security code;
receive, by the first computer system and through the second network, a content level security code, wherein the content level security code includes information to validate only a subset of the document;
perform, by the first computer system and based on the document level security code, a first validation operation;
determine, by the first computer system and based on the perform the first validation operation, the unencrypted document is an altered document;
execute, by the first computer system and in response to the determine the unencrypted document is an altered document, a second validation operation on the altered document, wherein the second validation operation is based on a context dictionary that contains one or more criteria and one or more templates; and
detect, by the first computer system and based on the second validation operation on the altered document, an alteration status of the document.

12. The system of claim 11, wherein the document includes one or more critical content sections, and wherein the alteration status of the document is innocuous data loss, and wherein the processor is further configured to:
present, by the first computer system, the altered document.

13. The system of claim 11, wherein the document includes one or more critical content sections, and wherein the alteration status of the document is that the one or more critical content sections is altered, and wherein the processor is further configured to:
generate, by the first computer system, a response, wherein the response includes a request to resend the document; and
transmit, to the second computer system, the response.

14. The system of claim 11, wherein the document is a pixel document, and wherein the execute the second validation operation includes performing a one-way function on a subset of pixels of the pixel document.

15. The system of claim 14, wherein the subset of pixels includes one or more critical content sections, and wherein the processor is further configured to:
identify, before the performing the one-way function and by the first computer system, the one or more critical content sections.

16. A computer program product, the computer program product comprising a computer readable storage medium having program instructions embodied therewith, the program instructions configured to:

receive, by a first computer system and through a first network, a document from a second computer system, wherein the document is a self-contained singularly stored document;

receive, by the first computer system and through a second network, a document level security code wherein one or more unencrypted portions of the document are viewable by any party that receives the document;

receive, by the first computer system and through the second network, a content level security code, wherein the content level security code includes information to validate only a subset of the document;

perform, by the first computer system and based on the document level security code, a first validation operation;

determine, by the first computer system and based on the perform the first validation operation, the document is an altered document;

execute, by the first computer system and in response to the determine the document is an altered document, a second validation operation on the altered document, wherein the second validation operation is based on a context dictionary that contains one or more criteria and one or more templates; and detect, by the first computer system and based on the second validation operation on the altered document, an alteration status of the document.

17. The computer program product of claim 16, wherein the document is a pixel document, and wherein the execute the second validation operation includes performing a one-way function on a subset of pixels of the pixel document.

18. The computer program product of claim 17, wherein the subset of pixels includes one or more critical content sections, and wherein the program instructions further configured to:

identify, before the performing the one-way function and by the first computer system, the one or more critical content sections.

19. The computer program product of claim 18, wherein the identify the one or more critical content sections includes accessing a first content datastore located adjacent to the first computer system, the first content datastore containing one or more first pre-defined classifiers.

20. The computer program product of claim 19, wherein the second computer system generates the content level security code by accessing a second content datastore located adjacent to the second computer system, the second content datastore containing one or more second pre-defined classifiers.

* * * * *